United States Patent [19]

Takata et al.

[11] Patent Number: 5,271,667
[45] Date of Patent: Dec. 21, 1993

[54] BRAKE FLUID PRESSURE CONTROL DEVICE

[75] Inventors: Koji Takata; Masato Yoshino, both of Itami, Japan

[73] Assignee: Sumitomo Electric Industries, Ltd., Osaka, Japan

[21] Appl. No.: 968,571

[22] Filed: Oct. 29, 1992

[30] Foreign Application Priority Data

Oct. 30, 1991 [JP] Japan .................................. 3-284850

[51] Int. Cl.⁵ .............................................. B60T 8/32
[52] U.S. Cl. ................................ 303/113.2; 303/116.1; 303/119.1
[58] Field of Search ............... 303/113.2, 113.3, 113.1, 303/115.1, 115.4, 115.5, 116.1, 116.2, 116.3, 117.1, 119.1, 119.2, 900, 901; 188/181 A, 181 R

[56] References Cited

U.S. PATENT DOCUMENTS

| 5,015,043 | 5/1991 | Resch | 303/113.2 X |
| 5,026,127 | 6/1991 | Arikawa | 303/116.1 X |
| 5,028,096 | 7/1991 | de la Broise | 303/115.4 |
| 5,123,716 | 6/1992 | Willmann | 303/119.1 X |
| 5,141,296 | 8/1992 | Arikawa | 303/116.1 X |

FOREIGN PATENT DOCUMENTS

| 58-16946 | 1/1983 | Japan | 303/116.1 |
| 2238836 | 6/1991 | United Kingdom | 303/113.2 |
| 2239913 | 7/1991 | United Kingdom | 303/113.2 |

*Primary Examiner*—Douglas C. Butler
*Attorney, Agent, or Firm*—Wenderoth, Lind & Ponack

[57] ABSTRACT

A brake fluid pressure control device has a wheel brake fluid pressure control valve including a discharge valve provided in a main fluid passage extending from a master cylinder to wheel brakes. A discharged fluid reservoir is provided to temporarily store the brake fluid discharged from the discharge valve. A pump is provided to pump the brake fluid out of the discharged fluid reservoir to return it to the main passage. A fluid supply passage branches from the main passage at a point upstream of a flow return point from the pump and extends to the discharged fluid reservoir. A traction control changeover valve is provided to check a fluid flow from the flow return point toward the master cylinder during traction control. A shutoff valve is provided to check a fluid flow from the master cylinder to the discharged fluid reservoir through the fluid supply passage while the master cylinder is pressurized. Further, the control device has an intermediate fluid reservoir provided upstream of the shutoff valve so as to be brought into communication with the supply passage during the traction control.

10 Claims, 4 Drawing Sheets

123  124  125

126  123

BRAKE FLUID PRESSURE CONTROL DEVICE

BACKGROUND OF THE INVENTION

The present invention relates to a brake fluid pressure control device of a simple structure and having both the function of antilock and traction control.

The simplest antilock device known is the so-called recirculating type which comprises a wheel brake fluid pressure control valve including a discharge valve provided in the main fluid passage extending from the master cylinder to each wheel brake, a discharged fluid reservoir for temporarily storing the brake fluid discharged from the discharge valve, and a pump for pumping the brake fluid out of the discharged fluid reservoir and returning it to the main passage. If it is desired to add the traction control function to this device, the structure of the entire device can be simplified most effectively by using the circulation pump for the antilock device as a pressure source for the traction control.

In order to employ such a structure, brake fluid has to be supplied to the inlet port of the pump. This can be done in several known ways.

These known ways are classified into two types. In one type, a supply passage is provided so as to extend directly from the reservoir for the master cylinder to the pump inlet port. In the other type, the supply passage is provided so as to branch from the main passage connecting the master cylinder outlet port to each wheel brake. Of these two types, the latter is advantageous in view of the easy mounting on a vehicle and the non-necessity of returning any redundant brake fluid to the reservoir for the master cylinder through its inlet port.

The latter method, in which the supply passage branches from the main passage, has a problem in that the amount of brake fluid that can be supplied into the pump is limited due to the resistance at the master cylinder inlet port, the resistance of the piping from the master cylinder to the brake fluid pressure control device and the flow resistance in a shutoff valve for shutting the supply passage during normal braking. Thus, there is a possibility that the brake fluid pressure may not increase sufficiently quickly when the traction control starts.

SUMMARY OF THE INVENTION

An object of the present invention is to improve the brake fluid supply capacity of a brake fluid pressure control device of the type described above, that is, the type in which a supply passage connecting to a discharged fluid reservoir branches from the main passage at a point upstream of the fluid-flow-return point from the pump.

The characterizing feature of the present invention consists in the provision of an intermediate fluid reservoir communicating with a fluid supply passage in order to eliminate the fluid intake resistance at the inlet port of the master cylinder and the resistance of the piping extending from the master cylinder to the brake fluid pressure control device.

The intermediate fluid reservoir has to be in communication with both the master cylinder and the discharged fluid reservoir during the traction control. In contrast, while the brake pressure is being applied in the normal braking mode, it has to be kept out of communication with the discharge fluid reservoir. According to the present invention, the intermediate fluid reservoir is provided at such a point that the two positions or phases can be reliably changed over.

Namely, a conventional device of the same type, as well as the device of the present invention, requires a traction control changeover valve for checking fluid flow from the flow return point from the pump toward the master cylinder during traction control and a shutoff valve for checking fluid flow from the fluid supply passage toward the discharged fluid reservoir during the normal braking mode (while the pressure in the master cylinder is being applied).

According to the present invention, the intermediate fluid reservoir is provided upstream of the shutoff valve. With this arrangement, the shutoff valve can be used to change over the communication of the intermediate fluid reservoir.

The shutoff valve may be provided as an extra valve independent of the traction control changeover valve (first form) or may be in the form of a three-port two-position traction control changeover valve provided at a branch point between the main passage and the fluid supply passage (second form). This latter changeover valve can selectively bring the master cylinder into communication with the flow return point from the pump or with the fluid supply passage. Thus, the use of the above extra valve can be eliminated. The present invention is applicable to either form.

In the first form, the intermediate fluid reservoir may be provided either in the main passage or in the fluid supply passage, as far as it is provided upstream of the shutoff valve. But in the second form, it has to be provided in the main passage, upstream of the traction control changeover valve, because this valve also serves as a shutoff valve.

During traction control, the intermediate fluid reservoir communicates with the pump, so that the brake fluid is supplied through the pump from the intermediate fluid reservoir. This serves to reduce the fluid intake resistance at the inlet port of the master cylinder and the resistance of the piping extending from the master cylinder to the brake fluid pressure control device, thereby reducing the fluid intake resistance and increasing the fluid supply capacity.

Also, by supplying fluid from the intermediate fluid reservoir, the amount of brake fluid drawn in through the master cylinder from its reservoir during traction control decreases. This serves to reduce the difference between the pedal stroke when the brake pedal is depressed during or immediately after traction control and the pedal stroke when the pedal is depressed during normal braking, thereby improving the pedal feeling. The smaller the amount of decrease in the pressure in the intermediate fluid reservoir below the atmospheric pressure, the greater these effects. Thus, it is extremely effective to provide the intermediate fluid reservoir with a volume control means to be described in the description of the embodiments.

As described above, according to the present invention, the intermediate fluid reservoir is provided in the main passage or the supply passage and it is adapted to be brought into communication, during traction control, with the supply passage branching from the main passage. Thus, the fluid supply capacity to the pump is kept high because it is not affected by the fluid intake resistance at the inlet port of the master cylinder or the resistance of the passage extending from the master cylinder to the brake fluid pressure control device. This allows simplification of the structure of the control device without delaying the rise of the brake fluid pressure at the initial stage of the traction control.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENT

Figure 1:
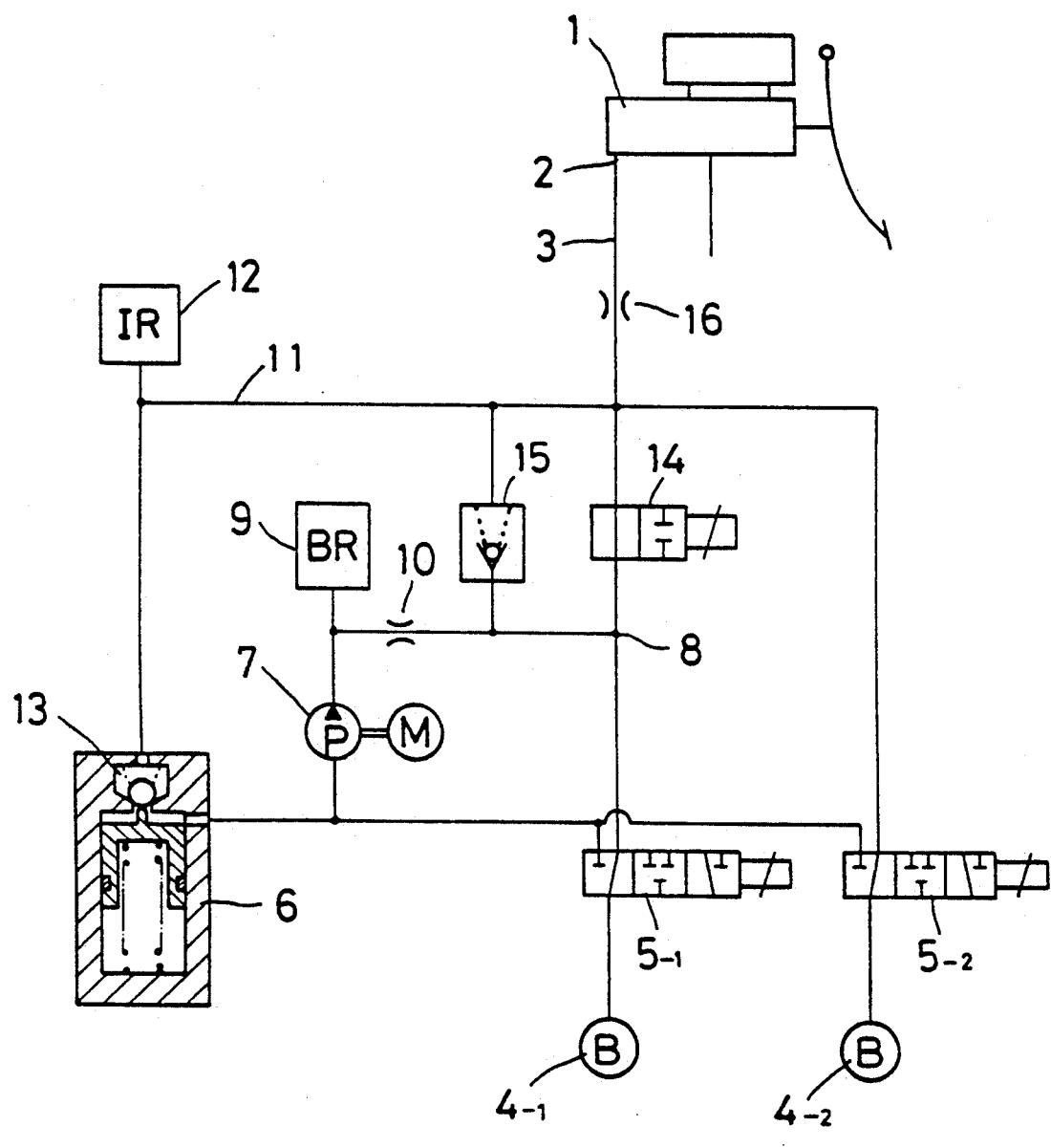
FIG. 1 is a circuit diagram of one embodiment according to the present invention.

FIG. 1 shows an example in which a main passage and a supply passage are normally in communication with each other, and a traction control changeover valve is a two-port two-position valve provided between the point at which the supply passage branches from the main passage and the flow return point from the pump.

A master cylinder 1 (a booster of any type may be attached thereto) has two outlet ports. We shall describe hereinafter only one line of the two lines, because the same explanation or discussion is applicable to both lines.

Wheel brake fluid pressure control valves 5-1 and 5-2 are provided in respective main passages connecting an outlet port 2 to wheel brakes 4-1 and 4-2. The wheel brake fluid pressure control valves may be a three-position type valve (as shown in FIG. 1) having pressure-increase, pressure-hold and pressure-decrease positions, or a two-position typle valve having no pressure-hold position. In many cases, a check valve (not shown) is attached to each of the control valves in parallel therewith to allow the brake fluid pressure to drop quickly when the pressure on the brake pedal is relaxed during antilock control.

When the brake fluid pressure control valves 5-1 and 5-2 are in their discharge positions, the wheel brakes 4-1 and 4-2 are in communication with a discharged fluid reservoir 6.

A pump 7 pumps the brake fluid out of the discharged fluid reservoir 6 and returns it to a flow return point 8 of one of the main passages. In order to prevent a pulsating flow of the fluid discharged from the pump 7, a buffer fluid reservoir 9(ER) and a throttle 10 are used in combination.

Described above is the basic structure of a recirculating type of antilock brake fluid pressure control device. In order to add a traction control function to this device, the following elements are added.

A supply passage 11 is provided that branches from the main passage at a branch point upstream of the flow return point 8 and extends to the discharged fluid reservoir 6. An intermediate reservoir 12 IR is provided which always communicates with the supply passage 11.

The discharged fluid reservoir 6 is provided with a stroke-responsive type of check valve 13 which serves as a shutoff valve to prevent the flow of fluid from the supply passage 11 to the discharged fluid reservoir 6 when the amount of brake fluid in the reservoir 6 exceeds a predetermined level and to allow the passage of fluid only while the amount of brake fluid in the reservoir is below the predetermined level.

The shutoff valve may also be a solenoid valve or a pressure-responsive valve. But, the stroke-responsive type of check valve as shown is advantageous over these valves in that its structure is simple and its cost is low. If the stroke-reponsive type check valve is used, the amount of fluid necessary for moving the piston in the discharged fluid reservoir 6 from its stroke end to the position in which the check valve is closed increases the initial dead stroke of the brake pedal. Thus, the piston stroke from the stroke end to the valve closing position is required to be as short as possible.

A traction control changeover valve 14 is provided between the circulation point 8 and the branch point to prevent the pressurized fluid from flowing back into the master cylinder during the traction control. Also, in order to allow backward fluid flow toward the intermediate reservoir when the pump discharge pressure has increased excessively, a high-pressure (corresponding to the upper limit of the fluid pressure necessary for the traction control, e.g. 100 bar) relief valve 15 is provided in parallel with the changeover valve 14.

Further, a throttle 16 may be added, if necessary, as long as it would not hinder the normal braking performance. It serves, in cooperation with the intermediate fluid reservoir 12, to strengthen the buffering effect by the combination of the buffer fluid reservoir 9 and the throttle 10.

When there are one driven wheel brake and one non-driven wheel brake in one output line of the master cylinder, the wheel brake 4-2 at the non-driven wheel side and the brake fluid pressure control valve 5-2 may be connected to the line branching from the point downstream of the traction control changeover valve 14 in the same manner as the wheel brake 4-1 and its brake fluid pressure control valve 5-1 at the driven wheel side. But preferably, they should be connected to a line branching from a point upstream of the valve 14. This is because, with this arrangement, it is not necessary to keep the control valve 5-2 activated during the traction control, and the pressure on the non-driven side wheel brakes can be increased instantly upon depression of the brake pedal.

The intermediate fluid reservoir 12 may be a simple fluid chamber as with the buffer fluid reservoir 9. But, for higher fluid supply capacity to the pump, it should preferably be provided with a volume control means for reducing the volume of the intermediate fluid reservoir when the internal fluid pressure drops below the atmospheric pressure, thereby keeping the internal pressure not much lower than the atmospheric pressure.

This volume control means should be capable of keeping the drop of the internal fluid pressure from the atmospheric pressure at a minimum. At the end of traction control, it should also have the function of pushing back the intermediate fluid reservoir to its initial volume prior to the brake fluid flowing back to the master cylinder reservoir via the master cylinder inlet port.

Without the latter function, the intermediate fluid reservoir might be pushed back at the next braking pressure application after the traction control has ended. This leads to a loss in the pedal stroke. The throttle 16 helps to preferentially push back the intermediate fluid reservoir.

The most effective way to increase the intake capacity of the pump is to keep the internal pressure of the intermediate fluid reservoir above the atmospheric pressure. But, for this purpose, the structure of the shutoff valve and the like will have to be complicated.

In order to attain both of the above functions efficiently, the volume control means should be designed so that its resistance to deformation becomes minimum.

An ordinary cylinder and piston assembly can therefore be used as the volume control means, provided the seal friction can be kept sufficiently small.

Figure 2A:
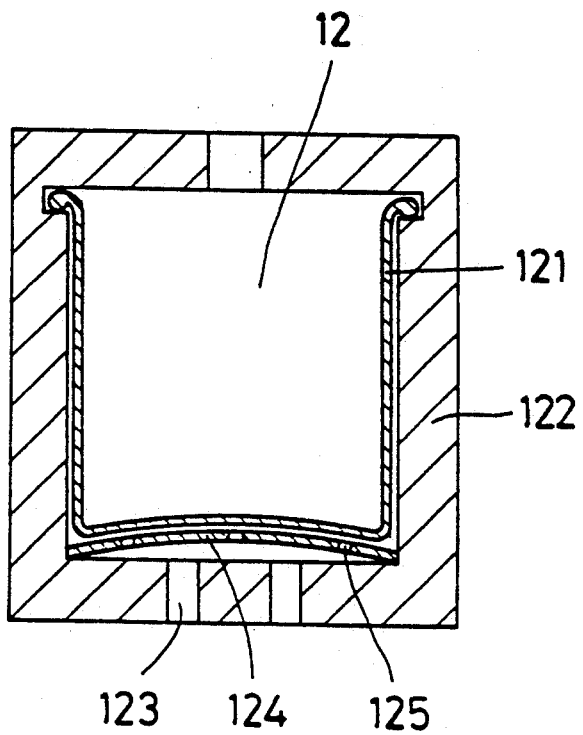
FIGS. 2A and 2B are sectional views showing the structure of an intermediate fluid reservoir having a volume control means.
Figure 2B:
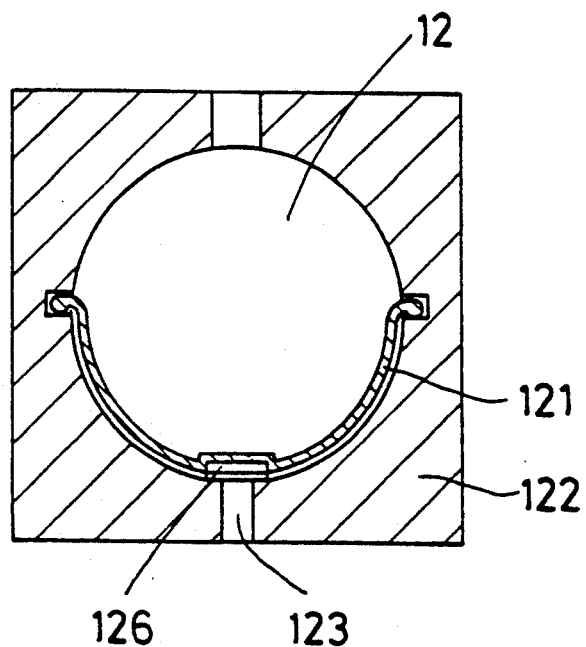

FIGS. 2A and 2B show examples which can reduce the resistance to deformation still further.

In FIG. 2A, the intermediate fluid reservoir 12 has a diaphragm 121 made of a resilient material such as rubber. A metallic outer wall 122 is provided with vent holes 123. A slightly arched, springy thin plate 124 is disposed between the outer wall 122 and the diaphragm 121 to prevent the diaphragm 121 from getting into the vent holes 123. A plurality of small holes 125 are formed in the thin plate 124 so as not to be overlapped with the vent holes 123. If a negative pressure is produced in the space defined by the diaphragm 121, the diaphragm will be deformed due to the atmospheric pressure that acts on the outside of the diaphragm through the vent holes 123, the space formed by the arched shape of the thin plate 124 and the holes 125. Thus, the internal volume in the fluid reservoir decreases until the internal pressure balances with the external pressure, at which time the deformation of the diaphragm stops. In this way, the internal pressure is kept at a value near the atmospheric pressure.

In this arrangement, the degree of arching of the thin plate 124 contributes to the initial dead stroke of the brake pedal. Thus, care must be taken that the thin plate would not be arched excessively.

The structure shown in FIG. 2B is characterized in that the diaphragm 121 can be deformed easily and is more durable against the internal pressure. This structure is similar to one generally used as a high-pressure gas sealed accumulator. The only difference from the accumulator is that the portions used as the high-pressure gas chamber and the hydraulic fluid chamber in an ordinary accumulator are used, in this example, as a fluid storage chamber and an atmospheric chamber, respectively. In this example, in place of the thin plate 124, a metal piece 126 molded integrally with the diaphragm 121 prevents the diaphragm from getting into the vent holes 123.

The stroke-responsive type check valve 13 of this example has a critical pressure that is determined by the balance between the effective sectional area of the valve body and the force of the return spring in the discharged fluid reservoir 6. Thus, in the structure shown in FIG. 1, if the brake fluid in the discharged fluid reservoir 6 is completely pumped out by the pump 7 during the antilock control and if the master cylinder pressure is lower than the critical pressure, the supply passage 11 and the discharged fluid reservoir 6, which have been shut off from each other, would communicate again. Thus, the pump will keep discharging fluid, instead of running idle, with a discharge pressure which is equal to the master cylinder pressure at that moment. If the critical pressure is sufficiently low, this will be of no problem in practice. But in a situation where this is not desirable, the stroke-responsive type check valve may be replaced with a pressure-responsive valve or a solenoid valve.

Figure 3:
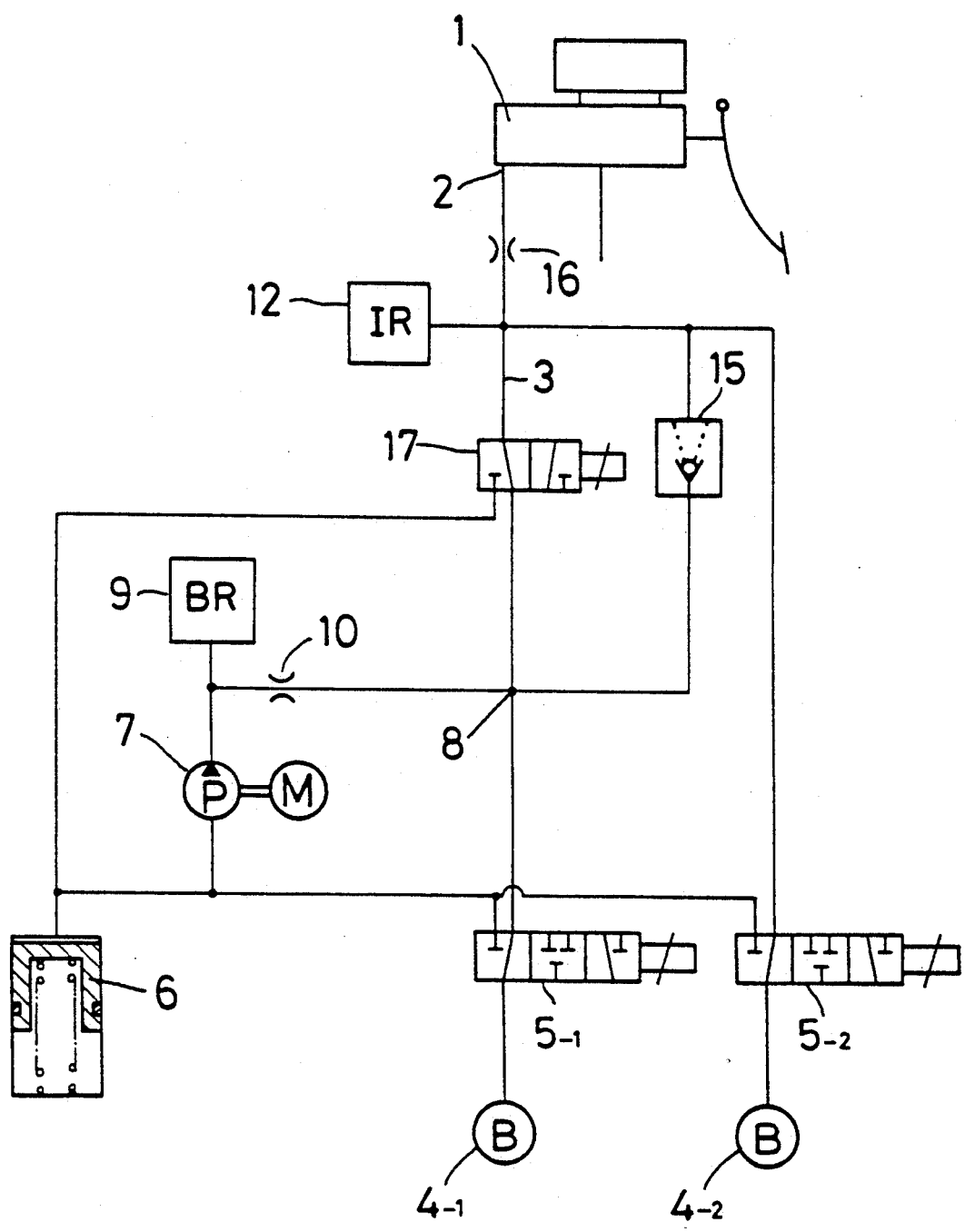
FIG. 3 is a circuit diagram of another embodiment.

FIG. 3 shows another embodiment.

In FIG. 3, a three-port two-position changeover valve 17 is provided at the branch point between the main passage and the supply passage. It has both the traction control changeover function and the shutoff function. There is no valve exclusively for shutoff as used in FIG. 1. Except for this fact, and except for the fact that the intermediate fluid reservoir 12 is provided in a main passage 3 at a point upstream of the changeover valve 17, this structure is the same as that of FIG. 1.

The structure shown in FIG. 3 is apparently very simple. But if the changeover valve 17 were not returned to its deactivated position as soon as the brake pedal is depressed during the traction control, the brake fluid in the master cylinder would flow into the discharged fluid reservoir 6 without resistance, thereby making it impossible to get a sufficient brake force even if the brake pedal is trod further. In this state, the subsequent antilock control function would be lost, too. This potential danger can be avoided by adding a pressure-responsive valve. But this will complicate the otherwise simple structure. Thus, in this example, for reliable functioning of the changeover valve 17, it is necessary to increase the reliability of the electric system including the brake switch.

In the structures shown in FIGS. 1 and 3, when the brakes are applied during traction control, and as a result the master cylinder is pushed in, the wheel brake control valves have to be changed over to the pressure re-increase position immediately. Otherwise, the wheel brake fluid pressure would not rise quickly enough. In this respect, too, it is necessary to increase the reliability of the electric system sufficiently.

Figure 4:
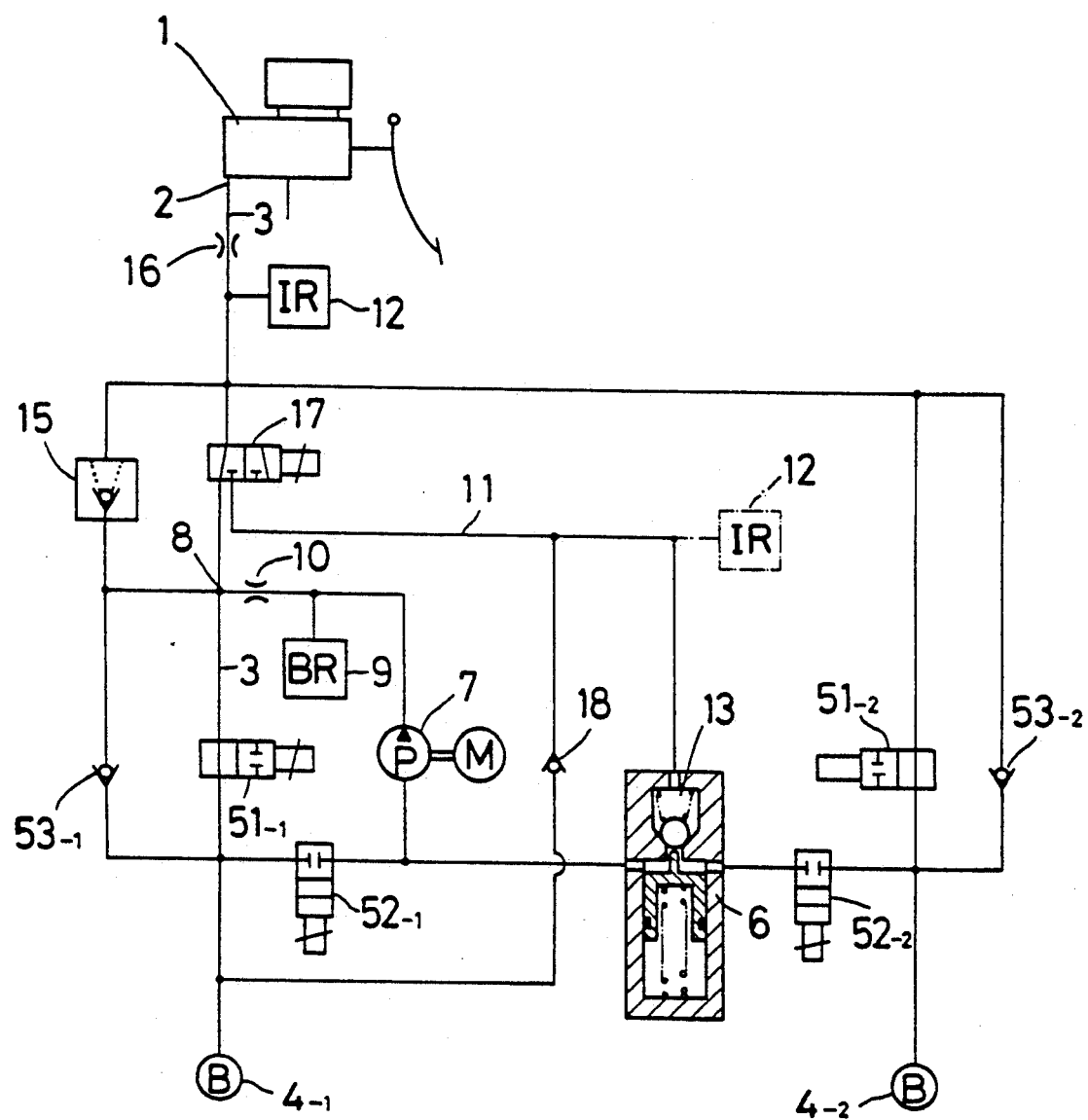
FIG. 4 is a circuit diagram of still another embodiment.

FIG. 4 shows a structure which can solve this problem. In FIG. 4, in order to increase the reliability of the system, the three-port two-position changeover valve 17 shown in FIG. 3 is used for traction control changeover and the stroke-responsive type check valve 13 is used as a shutoff valve.

By providing the stroke-responsive type check valve 13 downstream of the traction control changeover valve 17, the check valve 13 communicates with the main passage 3 only during the traction control. This prevents the dead stroke of the brake pedal which occurs when the check valve is arranged in the manner as shown in FIG. 1. Also, the idling of the pump is assured even in the case as discussed with reference to FIG. 1.

Also, by providing a circuit extending from the supply passage 11 to the wheel brake 4-1 and providing a check valve 18 in this circuit, the wheel brake fluid pressure can be increased quickly even if the master cylinder is pushed in during traction control without the need of switching the changeover valve 17 to the pressure reincrease position.

FIG. 4 shows the driven wheel brake control valve 5-1 and the non-driven wheel brake control valve 5-2 as each being separated, respectively, into three parts, 51-1, 52-1 and 53-1, and 51-2, 52-2 and 53-2, of which 53-1 and 53-2 are check valves that are not shown in FIGS. 1 and 3.

With the structures shown in FIGS. 1 and 3, the intermediate fluid reservoir 12 also serves to suppress the pump pulsation during antilock control, because it is kept in communication with the main passage 3 during antilock control.

In the structure of FIG. 4, by providing the intermediate fluid reservoir 12 in the main passage 3 as shown by solid line, it also serves to restrain the pump pulsation during antilock control.

On the other hand, by providing it in the supply passage as shown by chain line, it will serve to prolong the life of the diaphragm in the intermediate fluid reservoir. This arrangement also serves to prevent any bad influence on the pedal stroke during normal braking even if the intermediate fluid reservoir has a slightly poor rigidity or has a tendency to consume a small amount of ineffective fluid at the initial stage of pressure increase of the master cylinder. Another advantage is that the flow resistance in the changeover valve 17 when the valve position is switched to the traction control position may not reduce the brake fluid supply capacity to the pump.

But in the latter arrangement (the arrangement shown by chain line), it is necessary for the intermediate fluid reservoir to recover its initial volume upon completion of the traction control while the main passage and the supply passage are in communication through the traction control changeover valve 17.

The provision of a check valve 18 makes this arrangement possible because even if the timing of the changeover valve 17 to return to its original position is set to delay slightly in order to allow the intermediate fluid reservoir to recover its initial volume reliably, the brake pressure can be increased reliably during this delay.

Also, in the structure of FIG. 4, the relief valve 15 may be provided between the circulation point and the supply passage instead of between the circulation point and the main passage, in the same manner as the intermediate fluid reservoir 12, which may be provided not in the main passage, but in the supply passage.

What is claimed is:

1. A brake fluid pressure control device, comprising:
a master cylinder having a master cylinder reservoir;
at least one wheel brake;
a main fluid passage extending from said master cylinder to said at least one wheel brake;
a wheel brake fluid pressure control valve provided in said main fluid passage, said wheel brake fluid pressure control valve including at least a discharge valve;
a discharged fluid reservoir connected to said discharge valve for temporarily storing brake fluid discharged from said discharge valve;
a fluid return passage extending between said discharged fluid reservoir and a flow return point in said main fluid passage;
a pump provided in said fluid return passage for pumping brake fluid out of said discharged fluid reservoir and returning the brake fluid to said main passage;
a fluid supply passage branching from said main fluid passage upstream of said flow return point and extending to said discharged fluid reservoir;
changeover valve means for checking fluid flow from said flow return point toward said master cylinder during traction control, and shutoff valve means for checking fluid flow from said master cylinder to said discharged fluid reservoir through said fluid supply passage when said master cylinder is pressurized; and
an intermediate fluid reservoir provided upstream of said shutoff valve means so as to communicate with said fluid supply passage at least during traction control.

2. The brake fluid pressure control device of claim 1, wherein:
said intermediate fluid reservoir has an initial interior volume; and
a volume control means is provided for reducing the interior volume of said intermediate fluid reservoir if an interior brake fluid pressure drops below atmospheric pressure to maintain the interior brake fluid pressure at substantially the same level as atmospheric pressure, and for allowing said intermediate fluid reservoir to recover the initial interior volume thereof before brake fluid flows back to said master cylinder reservoir upon depressurization.

3. The brake fluid pressure control device of claim 2, wherein:
said shutoff valve means is located in said fluid supply passage and comprises a stroke-responsive check valve capable of checking fluid flow from said supply passage toward said discharged fluid reservoir if the amount of brake fluid in said discharged fluid reservoir exceeds a predetermined amount.

4. The brake fluid pressure control device of claim 2, wherein said changeover valve means comprises a three-port two-position valve located at a point where said fluid supply passage branches from said main fluid passage for selectively directing fluid flow from said master cylinder toward said flow return point or toward said fluid supply passage, and wherein said intermediate fluid reservoir is provided in said fluid supply passage between said three-port two-position valve and said shutoff valve means.

5. The brake fluid pressure control device of claim 2, wherein:
said changeover valve means and said shutoff valve means comprise a three-port two-position valve located at a point where said fluid supply passage branches from said main fluid passage for selectively directing fluid flow from said master cylinder toward said flow return point or toward said fluid supply passage.

6. The brake fluid pressure control device of claim 5, wherein:
said intermediate fluid reservoir is provided in said main fluid passage between said three-port two-position valve and said master cylinder.

7. The brake fluid pressure control device of claim 1, wherein:
said changeover valve means and said shutoff valve means comprise a three-port two-position valve located at a point where said fluid supply passage branches from said main fluid passage for selectively directing fluid flow from said master cylinder toward said flow return point or toward said fluid supply passage.

8. The brake fluid pressure control device of claim 7, wherein:
said intermediate fluid reservoir is provided in said main fluid passage between said three-port two-position valve and said master cylinder.

9. The brake fluid pressure control device of claim 1, wherein:
said shutoff valve means is located in said fluid supply passage and comprises a stroke-responsive check valve capable of checking fluid flow from said supply passage toward said discharged fluid reservoir if the amount of brake fluid in said discharged fluid reservoir exceeds a predetermined amount.

10. The brake fluid pressure control device of claim 1, wherein said changeover valve means comprises a three-port two-position valve located at a point where said fluid supply passage branches from said main fluid passage for selectively directing fluid flow from said master cylinder toward said flow return point or toward said fluid supply passage, and wherein said intermediate fluid reservoir is provided in said fluid supply passage between said three-port two-position valve and said shutoff valve means.

* * * * *